United States Patent
Gerding

(10) Patent No.: US 10,065,499 B2
(45) Date of Patent: Sep. 4, 2018

(54) VEHICLE POWER TRANSFER UNIT (PTU) WITH PLANETARY GEAR SET

(71) Applicant: GKN Driveline North America, Inc., Auburn Hills, MI (US)

(72) Inventor: Austin R. Gerding, Shelby Township, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 12 days.

(21) Appl. No.: 15/304,940

(22) PCT Filed: Apr. 24, 2014

(86) PCT No.: PCT/US2014/035256
§ 371 (c)(1),
(2) Date: Oct. 18, 2016

(87) PCT Pub. No.: WO2015/163876
PCT Pub. Date: Oct. 29, 2015

(65) Prior Publication Data
US 2017/0151871 A1  Jun. 1, 2017

(51) Int. Cl.
*B60K 17/34* (2006.01)
*F16H 37/04* (2006.01)
(Continued)

(52) U.S. Cl.
CPC ......... *B60K 17/346* (2013.01); *F16H 37/041* (2013.01); *F16H 48/10* (2013.01)

(58) Field of Classification Search
CPC .......... F16H 37/041; F16H 48/00–2048/2048; F16H 1/00–1/48
See application file for complete search history.

(56) References Cited

U.S. PATENT DOCUMENTS

| 4,019,598 A | 4/1977 | Fresmann et al. |
| 4,476,743 A | 10/1984 | Magin |
(Continued)

FOREIGN PATENT DOCUMENTS

| CN | 102256826 A | 11/2011 |
| CN | 103228477 A | 7/2013 |
(Continued)

OTHER PUBLICATIONS

JP Office Action for JP Application No. 2016-564050 dated Oct. 31, 2017 (5 pages).
(Continued)

*Primary Examiner* — Justin Holmes
*Assistant Examiner* — David R. Morris
(74) *Attorney, Agent, or Firm* — Jennifer M. Brumbaugh; Reising Ethington P.C.

(57) ABSTRACT

One implementation of a vehicle power transfer unit (PTU) assembly—such as thatfor an automobile—includes an input shaft, a planetary gear set, an intermediate shaft, a ring gear, and an output gear. The planetary gear set includes a sun gear, multiple planet gears, and an annular gear. The sun gear is attached to a housing of the vehicle PTU and does not rotate in use. The planet gears are interconnected to the input shaft and are driven by the input shaft. The annular gear is in turn driven by the planet gears. The intermediate shaft is interconnected to and driven by the annular gear. The ring gear is interconnected to the intermediate shaft, and the output gear is driven by the ring gear.

23 Claims, 2 Drawing Sheets

(51) Int. Cl.
*B60K 17/346* (2006.01)
*F16H 48/10* (2012.01)

(56) References Cited

U.S. PATENT DOCUMENTS

| | | | | |
|---|---|---|---|---|
| 4,615,238 A | * | 10/1986 | Cheatum | A01F 15/0841 100/179 |
| 4,911,260 A | * | 3/1990 | Miura | B60K 17/3462 180/248 |
| 6,344,011 B1 | * | 2/2002 | Hosle | B02C 15/006 241/110 |
| 6,851,501 B2 | * | 2/2005 | Gassmann | B60K 17/08 180/248 |
| 6,962,227 B1 | * | 11/2005 | Kirkwood | B60K 17/046 180/245 |
| 8,235,858 B1 | * | 8/2012 | Langenfeld | F16H 57/038 475/225 |
| 8,267,833 B2 | | 9/2012 | Mueller et al. | |
| 8,474,349 B2 | | 7/2013 | Grogg et al. | |
| 8,597,150 B1 | * | 12/2013 | Downs | B60K 23/08 475/221 |
| 8,821,334 B2 | | 9/2014 | Mueller et al. | |
| 9,028,357 B2 | * | 5/2015 | Peura | B60K 23/08 475/200 |
| 9,162,570 B2 | | 10/2015 | Mueller et al. | |
| 9,347,541 B2 | | 5/2016 | Brooks | |
| 2003/0004027 A1 | * | 1/2003 | Gassmann | B60K 17/08 475/221 |
| 2005/0090356 A1 | * | 4/2005 | Nakajima | B60K 17/16 475/221 |
| 2005/0247511 A1 | * | 11/2005 | Kirkwood | B60K 17/046 180/433 |
| 2012/0238395 A1 | | 9/2012 | Peura et al. | |
| 2013/0310209 A1 | | 11/2013 | Downs et al. | |
| 2014/0190758 A1 | | 7/2014 | Osborn et al. | |
| 2014/0213409 A1 | * | 7/2014 | Yoon | F16H 1/203 475/343 |
| 2014/0357445 A1 | * | 12/2014 | Brooks | F16H 48/10 475/225 |
| 2017/0151871 A1 | * | 6/2017 | Gerding | B60K 17/346 |

FOREIGN PATENT DOCUMENTS

| | | |
|---|---|---|
| CN | 103747976 A | 4/2014 |
| DE | 102011077089 A1 | 12/2012 |
| EP | 1980440 A1 | 10/2008 |
| JP | H05116551 A | 5/1993 |
| JP | 2011153680 A | 8/2011 |
| JP | 2012087910 A | 5/2012 |
| WO | WO2008142525 A1 | 11/2008 |

OTHER PUBLICATIONS

Written Opinion & International Search Report for PCT/US2014/035256 dated Aug. 28, 2014, 8 pages.
EP Extended Search Report for EP Application No. 14890066.5 dated Dec. 1, 2017 (6 pages).
CN Office Action for CN Application No. 201480078242.0 dated May 21, 2018 (12 pages).

* cited by examiner

VEHICLE POWER TRANSFER UNIT (PTU) WITH PLANETARY GEAR SET

TECHNICAL FIELD

The present disclosure relates generally to vehicle power transfer units (PTUs), and more particularly to shaft and gear assemblies used in vehicle PTUs.

BACKGROUND

In general, vehicle drivelines transmit torque from a vehicle's engine to its wheels. Automotive drivelines sometimes include power transfer units (PTUs, also known as power take-off units) for selectively distributing torque among shafts in the drivelines. The PTUs are often equipped in four-wheel and all-wheel automotive driveline configurations. A power transfer unit typically consists of a housing that encloses and supports gears, shafts, and bearings. Packaging in automotive drivelines, as elsewhere in automobiles, often demands inflexible size constraints. And sometimes the size constraints present challenges when designing PTUs to produce a desired torque output while still satisfying durability requirements imposed by automotive manufacturers.

SUMMARY

In one implementation, a vehicle power transfer unit (PTU) assembly includes an input shaft, a planetary gear set, an intermediate shaft, a ring gear, and an output gear. The input shaft rotates about a first axis. The planetary gear set is driven by the input shaft and includes a sun gear, multiple planet gears, and an annular gear. The sun gear is fixed against rotation. The planet gears are interconnected to the input shaft and are driven by the input shaft. The planet gears revolve around the sun gear. The annular gear is driven by the planet gears. The intermediate shaft rotates about the first axis, is interconnected to the annular gear, and is driven by the annular gear. The ring gear is interconnected to the intermediate shaft and rotates with the intermediate shaft. The output gear rotates about a second axis. The second axis is arranged at an angle with respect to the first axis. The output gear is driven by the ring gear.

In another implementation, a vehicle power transfer unit (PTU) assembly includes an input shaft, a planetary gear set, a sleeve shaft, a ring gear, and a pinion gear. The planetary gear set is coaxial with the input shaft and includes a sun gear, multiple planet gears, and an annular gear. The sun gear remains stationary with respect to the planet gears when the vehicle PTU is in use. The planet gears are directly interconnected to the input shaft without an intermediate gear located between the planet gears and the input shaft. The planet gears are driven by the input shaft and revolve around the sun gear. The annular gear is driven directly by the planet gears via gear-to-gear driving and engagement. The sleeve shaft is coaxial with the input shaft and is directly interconnected to the annular gear without an intermediate gear located between the sleeve shaft and the annular gear. The sleeve shaft is driven by the annular gear. The ring gear is coaxial with the input shaft and is carried by the sleeve shaft. The pinion gear is not coaxial with the input shaft. The pinion gear is directly driven by the ring gear via gear-to-gear driving and engagement.

DETAILED DESCRIPTION

Figure 1:
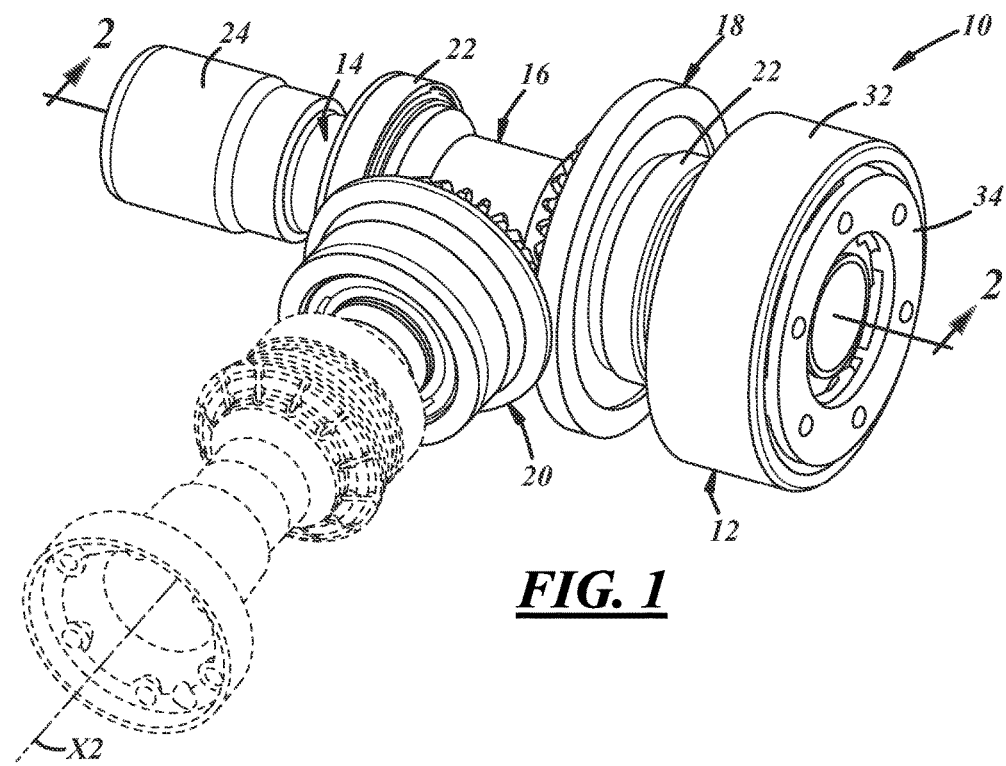
FIG. 1 is a perspective view of a vehicle power transfer unit (PTU) assembly.

Referring to the drawings, a vehicle power transfer unit (PTU) assembly 10 for an automotive vehicle satisfies torque and durability requirements oftentimes imposed by automotive manufacturers. Hence, the torque duty cycle capacity of the PTU assembly 10 is augmented. The PTU assembly 10 is equipped with a planetary gear set 12 to furnish a relatively compact design and construction in order to meet size constraints that are frequently inflexible in installation. While illustrated by one embodiment in the figures, the PTU assembly 10 can have different designs and constructions in other embodiments, some of which are described below. Indeed, its exact design and construction commonly depends on the particular application in which the PTU assembly 10 is installed. The applications can involve various steering, engine, and transmission components, and the accompanying packaging demands, all of which can dictate the design and construction of the PTU assembly 10. As an aside, the terms axially, radially, circumferentially, and their related forms, as used in this description are with respect to the generally circular and cylindrical components of the PTU assembly 10, unless otherwise specified.

Figure 2:
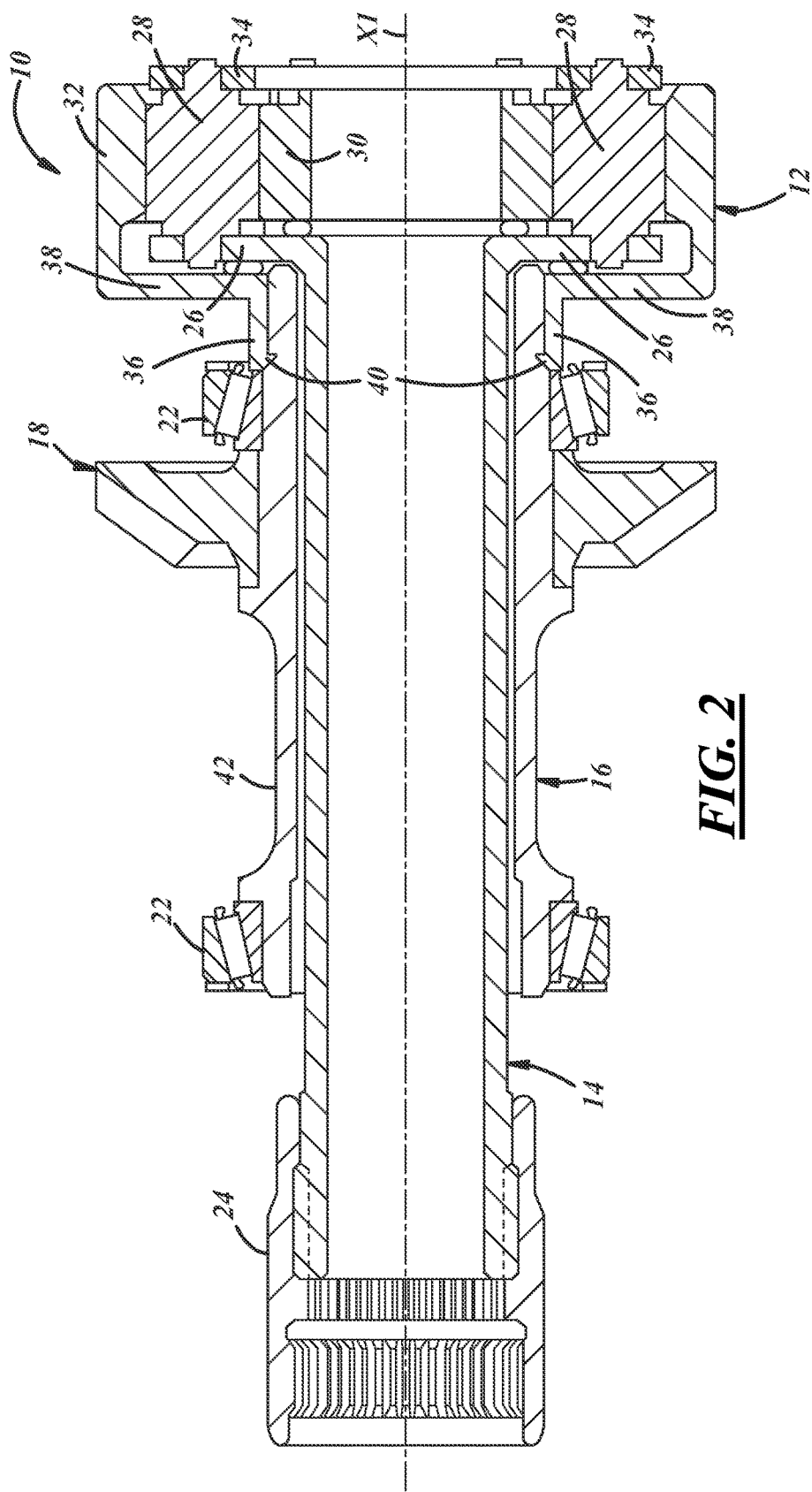
FIG. 2 is a cross-sectional view taken at arrows 2-2 in FIG. 1.

In the embodiment of FIGS. 1 and 2, the PTU assembly 10 is a multi-piece mechanism with components that work together in order to produce a desired torque output. In this embodiment, the PTU assembly 10 includes an input shaft 14, the planetary gear set 12, an intermediate shaft 16, a ring gear 18, and an output gear 20. Other components can include bearings 22, seals, and yet additional shafts and gears. And although not depicted in the figures, a PTU housing, cover, and/or intermediate structure composed of a metal or non-metallic material encloses and supports components of the PTU assembly 10.

The input shaft 14 can be interconnected to, and thus driven by, an upstream driveline component such as a differential. A coupling 24 is shown for making this interconnection at one end of the input shaft 14, but other ways and components for doing so are possible. The input shaft 14 is a hollow metal tube in this embodiment. It rotates about a first axis X1 when the PTU assembly 10 is put to use in the larger automotive driveline. At an end opposite the coupling 24, the input shaft 14 has a flange 26 projecting radially outwardly from a main tubular body of the input shaft. The flange 26 presents a unitary extension of the input shaft 14, and is used to interconnect the input shaft and planetary gear set 12 together. In particular, the flange 26 is directly interconnected to multiple planet gears 28 of the planetary gear set 12. The direct interconnection can be carried out by way of bolting, welding, force-fitting, riveting, or via other mechanical attachment techniques. The interconnection is direct in the sense that it lacks an intermediate component located between the flange 26 and the planet gears 28 like an added gear or shaft or something similar.

The planetary gear set 12 increases the speed and reduces the torque from incoming rotational movement to outgoing rotational movement. The planetary gear set 12 is interconnected to, and thus driven by, the input shaft 14. And like the input shaft 14, the planetary gear set 12 rotates about the first axis X1; in other words, the planetary gear set and input shaft are coaxial. As illustrated in FIGS. 1 and 2, the planetary gear set 12 is located at one end of the input shaft 14 at the flange 26, but could be located elsewhere along the input shaft such as approximately midway between the input shaft's terminal ends. Incoming rotational movement is received from the input shaft 14, and outgoing rotational movement is transmitted to the intermediate shaft 16. From the input shaft 14 to the intermediate shaft 16, the planetary gear set 12 provides a torque reduction functionality. In one specific example, the planetary gear set 12 gives an approximately 1.5:1 torque reduction; of course other torque reduction values are possible in other examples. The exact torque reduction will depend on, among other possible factors, the diameters of the associated components. The torque reduction—along with the attendant speed increase—improves the overall durability performance of the PTU assembly 10 and its duty cycle capabilities, as described in greater detail below. Moreover, the arrangement of gears in the planetary gear set 12 exhibit a relatively compact design and construction to achieve these improvements, so that packaging and size constraints can be more readily satisfied compared to other gear arrangements.

Still referring to FIGS. 1 and 2, the planetary gear set 12 includes a sun gear 30, the planet gears 28, and an annular gear 32. The sun gear 30 is located at the very end of the input gear 14 next to the flange 26. The sun gear 30 is coaxial with the input shaft 14. For a torque reduction and speed increase, the sun gear 30 is attached to the PTU housing and therefore remains stationary and does not rotate during use of the PTU assembly 10. Attachment could be carried out by way of bolting, welding, force-fitting, riveting, or via other mechanical attachment techniques. Put differently, the sun gear 30 is grounded to the PTU housing and is fixed against rotation in operation. The planet gears 28 revolve around the sun gear 30 and around the first axis X1 during use of the PTU assembly 10. Each planet gear 28 also rotates about its own axis as each planet gear revolves around the first axis X1. There can be different quantities of discrete and individual planet gears 28, such as two, three, four, or more. Each planet gear 28 has teeth that mesh directly with teeth of the sun gear 30, and mesh directly with teeth of the annular gear 32. On one side the planet gears 28 are directly interconnected to the flange 26, as previously described, and are hence directly driven by the input shaft 14. On another side the planet gears 28 are directly interconnected to a carrier 34. The carrier 34 holds the planet gears 28 in place relative to one another, and rotates with the planet gears in operation. Lastly, the annular gear 32 rotates around the sun gear 30 and is coaxial with the input shaft 14. Radially-inwardly teeth of the annular gear 32 mesh directly with the teeth of the planet gears 28, and hence the annular gear is directly driven by the planet gears. On one side of the annular gear 32, a flange 36 projects axially outboard of a side wall 38. The flange 36 may be a unitary extension of the annular gear 32 (that is, all structures are formed in one-piece of material) and is used to directly interconnect the annular gear and intermediate shaft 16 together. The direct interconnection can be achieved via a splined mating 40 as shown in FIG. 2, bolting, welding, force-fitting, riveting, threading, or via other mechanical attachment techniques. In the embodiment shown, the attachment lacks an intermediate component between the annular gear 32 and intermediate shaft 16. Upon interconnection, and as perhaps depicted best in FIG. 2, the flange 36 overlaps both the intermediate shaft 16 and the input shaft 14 along the first axis X1.

The intermediate shaft 16 is interconnected to, and thus driven by, the planetary gear set 12. In particular, and as described above, the intermediate shaft 16 is directly driven by the annular gear 32 via the direct interconnection between the two. The intermediate shaft 16 is a hollow metal tube in this embodiment, and rotates about the first axis X1. As with other components, the intermediate shaft 16 and input shaft 14 are coaxial. In relation to each other, the intermediate shaft 16 overlaps and circumferentially surrounds the input shaft 14 at a radially outward location of the input shaft. This is perhaps depicted best in FIG. 2, and in this sense the intermediate shaft 16 is a sleeve shaft since it fits over and around the input shaft 14. Put differently, in this embodiment the input shaft 14 is set radially inside of the sleeve shaft 16 with a slight clearance between their confronting surfaces to preclude interference as the shafts rotate in operation. The sleeve shaft 16 has an axial length that is less than the axial length of the input shaft 14, and therefore does not entirely overlap the input shaft end-to-end. The overlap in this embodiment is dictated by packaging demands, and in other embodiments the intermediate shaft 16 need not be a sleeve shaft and need not fit over the input shaft 14 as illustrated. Rotation of the sleeve shaft 16 is facilitated by the bearings 22. The sleeve shaft 16 is directly interconnected to the ring gear 18 without an intermediate component therebetween. At its outer surface 42, the sleeve shaft 16 carries the ring gear 18 so that the sleeve shaft and ring gear rotate together during operation. The direct interconnection can be accomplished by way of bolting, welding, force-fitting, riveting, or via other mechanical attachment techniques.

Still referring to FIGS. 1 and 2, the ring gear 18 is interconnected to, and thus driven by, the intermediate shaft 16. In particular, and as described above, the ring gear 18 is directly driven by the intermediate shaft 16 via the direct interconnection between the two. The ring gear 18 can make up one part of a hypoid or helical gear set that also includes the output gear 20. The ring gear 18 rotates about the first axis X1 and is thus coaxial with the input shaft 14. In relation to each other, the ring gear 18 is positioned at a radially outward side of the intermediate shaft 16. And while the ring gear 18 is located between the terminal ends of the intermediate shaft 16, it could be located near or at the terminal ends.

Referring now to FIG. 1, the output gear 20 is directly driven by the ring gear 18. At an end opposite the ring gear 18, the output gear 20 can be interconnected to and/or can drive a downstream driveline component such as a cardan shaft. The output gear 20 has teeth that mesh directly with teeth of the ring gear 18. In use, the output gear 20 rotates about a second axis X2 that is set at an angle to the first axis X1. In one example, the first and second axes X1, X2 are perpendicular relative to each other. The output gear 20 can be a pinion gear that makes up another part of the hypoid or helical gear set.

Figure 3:
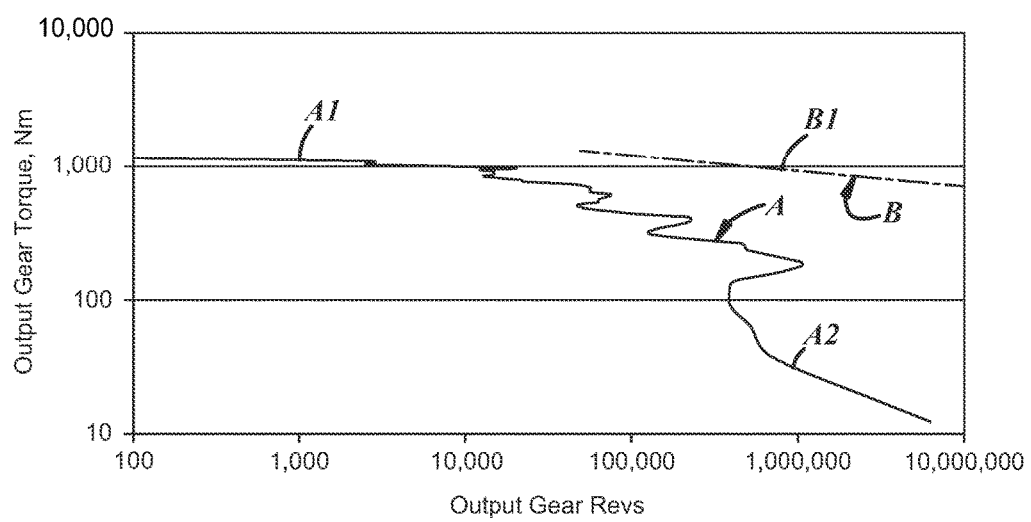
FIG. 3 is a graph plotting torque in Newton meters (Nm) on the y-axis, and plotting number of gear revolutions on the x-axis.

In use, the vehicle PTU assembly 10 satisfies torque and durability requirements oftentimes imposed by automotive manufacturers, while meeting size constraints also imposed. Referring to FIG. 3, in one example a torque duty cycle line A is imposed. At a point A1, for instance, a particular PTU assembly is required to endure approximately 1,000 Newton meters (Nm) of torque when running at approximately 1,000 revolutions; and at a point A2, a particular PTU assembly is required to endure approximately 50 Nm of torque when running at approximately 1,000,000 revolutions. These durability requirements are typically imposed on the hypoid or helical gear set of the PTU assembly (in this embodiment, the ring gear 18 and output gear 20). As described above, the planetary gear set 12 reduces the torque of rotational movement transmitted through it and thus imparts an augmented torque duty cycle capacity to the PTU assembly 10. In FIG. 3, a torque and durability capacity of the PTU assembly 10 is represented by line B. Since line B is plotted well above the torque duty cycle line A, the PTU assembly 10 readily satisfies that requirement. For instance, at a point B1, the PTU assembly 10 can endure approximately 1,000 Nm of torque when running at approximately 1,000,000 revolutions—this easily meets the point A2 requirement. The torque and durability capacity represented by line B enhances the useful lifetime of the PTU assembly 10. It should be appreciated that the data presented in FIG. 3 is the result of a simulation, and that not all simulations will necessarily yield these exact results. The simulation was conducted on a PTU assembly similar to that of FIGS. 1 and 2.

Lastly, other embodiments of the PTU assembly 10 can have different designs and constructions than illustrated in the figures. For instance, the PTU assembly of the figures presents a single-axis architecture, but the PTU assembly could also have a double-axis architecture. And while the PTU assembly 10 lacks a clutch mechanism equipped among its components, other embodiments of the PTU assembly could include one. Further, while the figures do not depict individual teeth on all of its gears, skilled artisans will appreciate that gear teeth are indeed present on the gear components including the sun gear, planet gears, annular gear, ring gear, and output gear.

It is to be understood that the above description is intended to be illustrative and not restrictive. Many embodiments and applications other than the examples provided would be apparent to those of skill in the art upon reading the above description. The scope of the invention should be determined, not with reference to the above description, but instead with reference to the appended claims, along with the full scope of equivalents to which such claims are entitled. It is anticipated and intended that future developments will occur in the arts discussed herein, and that the disclosed assemblies and methods will be incorporated into such future embodiments. In sum, it should be understood that the invention is capable of modification and variation and that is limited only by the following claims.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. Further, the terms "axial" or "axially" and "radial" or "radially" are used for ease of description with reference to the identified axis or axes; these terms are not intended to be limiting and other terms like lateral, longitudinal, inward, outward, or the like are intended to be covered and not excluded.

What is claimed is:

1. A vehicle power transfer unit (PTU) assembly, comprising:
    an input shaft rotating about a first axis;
    a planetary gear set driven by said input shaft, said planetary gear set including a sun gear, a plurality of planet gears, and an annular gear, said sun gear being fixed against rotation, said plurality of planet gears interconnected to said input shaft and driven by said input shaft and revolving around said sun gear, said annular gear driven by said plurality of planet gears;
    an intermediate shaft rotating about the first axis and interconnected to said annular gear and driven by said annular gear;
    a ring gear interconnected to said intermediate shaft and rotating with said intermediate shaft; and
    an output gear rotating about a second axis arranged at an angle relative to the first axis, said output gear driven by said ring gear.

2. A vehicle power transfer unit (PTU) assembly as set forth in claim 1, wherein said input shaft and said planetary gear set are coaxial relative to each other about the first axis with said plurality of planet gears revolving around the first axis.

3. A vehicle power transfer unit (PTU) assembly as set forth in claim 1, wherein the interconnection between said input shaft and said plurality of planet gears is a direct interconnection without an intermediate component therebetween.

4. A vehicle power transfer unit (PTU) assembly as set forth in claim 1, wherein the interconnection between said annular gear and said intermediate shaft is a direct interconnection without an intermediate gear therebetween.

5. The assembly as set forth in claim 4 wherein the input shaft includes a tubular main body and a flange that is formed from the same piece of material as the main body and extends radially outwardly from the main body, and wherein said plurality of planet gears are connected to the flange for rotation with the input shaft about the first axis.

6. A vehicle power transfer unit (PTU) assembly as set forth in claim 1, wherein said intermediate shaft is a sleeve shaft overlapping said input shaft at a radially outward location of said input shaft.

7. A vehicle power transfer unit (PTU) assembly as set forth in claim 6, wherein said ring gear rotates with said sleeve shaft about the first axis.

8. A vehicle power transfer unit (PTU) assembly as set forth in claim 1, wherein said ring gear directly drives said output gear via direct gear-to-gear driving.

9. A vehicle power transfer unit (PTU) assembly as set forth in claim 8, wherein said output gear is a pinion gear.

10. A vehicle power transfer unit (PTU) assembly as set forth in claim 1, wherein the second axis is arranged orthogonally relative to the first axis.

11. A vehicle power transfer unit (PTU) assembly as set forth in claim 1, wherein the vehicle PTU assembly is free of a clutch mechanism installed among said input shaft, said planetary gear set, said intermediate shaft, said ring gear, and said output gear.

12. The vehicle power transfer unit (PTU) assembly as set forth in claim 1 wherein the annular gear has a unitary extension and the intermediate shaft is connected to the annular gear via the unitary extension so that the intermediate shaft and annular gear rotate together.

13. The vehicle power transfer unit (PTU) assembly as set forth in claim 12 wherein the annular gear includes a sidewall and the unitary extension includes an axially extending flange projecting from the sidewall.

14. A vehicle power transfer unit (PTU) assembly, comprising:
    an input shaft;
    a planetary gear set coaxial with said input shaft and including a sun gear, a plurality of planet gears, and an annular gear, said sun gear held against rotation and remaining stationary relative to said plurality of planet gears when the vehicle PTU is in use, said plurality of planet gears directly interconnected to said input shaft without an intermediate component therebetween and driven by said input shaft and revolving around said sun gear, said annular gear directly driven by said plurality of planet gears via gear-to-gear driving;

a sleeve shaft coaxial with said input shaft and directly interconnected to said annular gear without an intermediate gear therebetween, said sleeve shaft driven by said annular gear;

a ring gear coaxial with said input shaft and carried by said sleeve shaft; and a pinion gear non-coaxial with said input shaft and directly driven by said ring gear via gear-to-gear driving.

15. The assembly as set forth in claim 14, wherein said input shaft and said planetary gear set are coaxial relative to each other about a first axis with said plurality of planet gears revolving around the first axis.

16. The assembly as set forth in claim 14, wherein said sleeve shaft radially overlaps at least part of said input shaft.

17. The assembly as set forth in claim 16, wherein said ring gear rotates with said sleeve shaft about a first axis.

18. The assembly as set forth in claim 17, wherein said pinion gear rotates about a second axis that is not parallel to the first axis.

19. The assembly as set forth in claim 18, wherein said second axis is orthogonal to the first axis.

20. The assembly as set forth in claim 14 wherein the plurality of planet gears are directly coupled to the input shaft so that the planet gears co-rotate with the input shaft about the first axis, and wherein each planet gear also rotates relative to the input shaft about a separate axis of rotation that is offset from the first axis.

21. The assembly as set forth in claim 20 wherein the input shaft includes a tubular main body and a flange that is formed from the same piece of material as the main body and extends radially outwardly from the main body, and wherein said plurality of planet gears are connected to the flange for rotation with the input shaft.

22. The assembly as set forth in claim 14 wherein the annular gear has a unitary extension and the intermediate shaft is connected to the annular gear via the unitary extension so that the intermediate shaft and annular gear rotate together.

23. The assembly as set forth in claim 22 wherein the annular gear includes a sidewall and the unitary extension includes an axially extending flange projecting from the sidewall.

* * * * *